United States Patent
Yang et al.

(10) Patent No.: US 7,041,754 B2
(45) Date of Patent: May 9, 2006

(54) EMULSION TYPE MODIFIER FOR IMPROVING PROPERTIES OF PRESSURE SENSITIVE EMULSION ACRYLIC ADHESIVES

(75) Inventors: Bin-Yen Yang, Taipei (TW); Chi-Lin Kao, Taipei (TW); Pei-Ling Lee, Shu Lin (TW); Chao-Yo Lin, Zhong He (TW)

(73) Assignee: Chief Investment Corp., Taipei (TW)

( * ) Notice: Subject to any disclaimer, the term of this patent is extended or adjusted under 35 U.S.C. 154(b) by 41 days.

(21) Appl. No.: 10/735,275

(22) Filed: Dec. 12, 2003

(65) Prior Publication Data
US 2004/0192820 A1 Sep. 30, 2004

(30) Foreign Application Priority Data
Dec. 12, 2002 (TW) ............................... 91135910 A

(51) Int. Cl.
C09D 129/14 (2006.01)
C09D 131/04 (2006.01)
C09D 133/06 (2006.01)
C09D 135/02 (2006.01)

(52) U.S. Cl. .................. 526/89; 526/315; 526/325; 526/329.5; 526/330; 526/910; 526/912; 526/931

(58) Field of Classification Search .................. 526/89, 526/315, 325, 329.5, 330, 910, 911, 912, 526/931
See application file for complete search history.

(56) References Cited

U.S. PATENT DOCUMENTS 5,164,444 A * 11/1992 Bernard .................. 524/833
2001/0003765 A1* 6/2001 Mallya et al. ............. 524/710

FOREIGN PATENT DOCUMENTS

WO    WO 200036039 A2 *  6/2000

* cited by examiner

Primary Examiner—Kelechi C. Egwim
(74) Attorney, Agent, or Firm—J.C. Patents

(57) ABSTRACT

The present invention relates to an emulsion type modifier for improving properties of the pressure-sensitive emulsion acrylic adhesives. The emulsion type modifier comprises: (a) 15 to 35 parts per hundred of monomers of a diester of a dicarboxylic acid; (b) 15 to 35 parts per hundred of monomers of vinyl esters; (c) 35 to 65 parts per hundred of monomers of alkyl acrylates; based on the total weight of (a)+(b)+(c), and (d) 0.1 to 2.0 parts per hundred of an acetoacetoxy functional monomer; (e) 0.1 to 2.0 parts per hundred of a nonionic surfactant; and (f) 0.4 to 3.0 parts per hundred of an anionic surfactant. By adding the emulsion type modifier of the present invention, the steel adhesion, polyethylene (PE) adhesion, the loop tack and the holding power of the pressure-sensitive emulsion acrylic adhesives can be improved.

8 Claims, No Drawings

EMULSION TYPE MODIFIER FOR IMPROVING PROPERTIES OF PRESSURE SENSITIVE EMULSION ACRYLIC ADHESIVES

CROSS-REFERENCE TO RELATED APPLICATION

This application claims the priority benefit of Taiwan application serial no. 91135910, filed on Dec. 12, 2002.

BACKGROUND OF THE INVENTION

1. Field of Invention

The present invention relates to an emulsion type modifier. More particularly, the present invention relates to an emulsion type modifier for improving properties of the pressure-sensitive emulsion acrylic adhesives.

2. Description of Related Art

In general, the pressure-sensitive emulsion acrylic adhesives have inferior surface adhesion toward the low surface energy substrates, such as the polyolefins. Thus, tackifiers are usually needed for improving the adhesion of the pressure-sensitive emulsion acrylic adhesives. The representative tackifiers for the pressure-sensitive emulsion acrylic adhesives are the rosin resins. The rosin resins are in fact one type of acidic natural resins extracted from the pine trees. However, the quality of the rosin resins is not always stable and usually varies if obtained from different pine trees of various origins, from diverse weathers or numerous tree spices. Due to the compatibility of the rosin resins and the pressure-sensitive emulsion acrylic adhesives, the physical properties of the pressure-sensitive emulsion acrylic adhesives may be deteriorated if too much rosin resins are added.

SUMMARY OF THE INVENTION

The present invention provides an emulsion type modifier of high stability and good durability, of which a small quantity of addition significantly improves adhesion of the pressure-sensitive emulsion acrylic adhesives.

As embodied and broadly described herein, the present invention provides an emulsion type modifier for improving properties of the pressure-sensitive emulsion acrylic adhesives. The emulsion type modifier comprises: (a) 15 to 35 parts per hundred of monomers of a C6–C12 diester of a dicarboxylic acid; (b) 15 to 35 parts per hundred of monomers of C2–C16 vinyl esters; (c) 35 to 65 parts per hundred of monomers of C4–C8 alkyl acrylates; based on the total weight of (a)+(b)+(c), and (d) 0.1 to 2.0 parts per hundred of an acetoacetoxy functional monomer; (e) 0.1 to 2.0 parts per hundred of a nonionic surfactant; and (f) 0.4 to 3.0 parts per hundred of an anionic surfactant. The emulsion type modifier of the present invention has an average particle diameter between about 0.1~0.4 microns, a glass transit temperature (Tg) between about −50~−30° C. and a solid content of about 50%–70% by weight (wt. %).

By adding the emulsion type modifier of the present invention, the steel adhesion, polyethylene (PE) adhesion, the loop tack and the holding power of the pressure-sensitive emulsion acrylic adhesives can be improved. The addition amount of the emulsion type modifier is about 5 to 30 parts per hundred, relative to the amount of the pressure-sensitive elusion acrylic adhesive.

It is to be understood that both the foregoing general description and the following detailed description are exemplary, and are intended to provide further explanation of the invention as claimed.

DESCRIPTION OF THE PREFERRED EMBODIMENTS

The present invention provides an emulsion type modifier for improving the steel adhesion, polyethylene (PE) adhesion and the loop tack and holding power of the pressure-sensitive emulsion acrylic adhesives.

The emulsion type modifier can be produced by any available method of emulsion and polymerization. According to the preferred embodiment, the composition of the emulsion type modifier comprises monomers of:

(a) a diester of a dicarboxylic acid containing 4–12 carbons, for example, dioctyl maleate or dibutyl maleate, 15 to 35 parts per hundred;

(b) vinyl ester containing 2–16 carbons, for example, vinyl butyrate, allyl acetate, vinyl isobutyrate or vinyl acetate, 15 to 35 parts per hundred;

(c) alkyl acrylates containing 4–8 carbons, for example, ethyl acrylate, butyl acrylate, 2-ethyl hexyl methacrylate, decyl acrylate, methyl methacrylate or butyl methacrylate, 35 to 65 parts per hundred; and (d) monomers containing acetoacetoxy functional groups, for example, ethyl acetoacetoxy methacrylate or butyl acetoacetoxy methacrylate, 0.1 to 2.0 parts per hundred, based on the total weight of (a)+(b)+(c).

The composition of the emulsion type modifier may further comprise different types of surfactants for improving stability and reaction rates for emulsion and polymerization, and film build and hydrolysis resistance of the products. The surfactants include a mixture of anionic surfactants and nonionic surfactants, 0.5 to 5.0 parts per hundred, based on the total weight.

The composition of the emulsion type modifier may further comprise:

(e) a nonionic surfactant, for example, polyoxethyene nonyl phenyl ether, polyoxethyene octyl phenyl ether, polyethylene glycol alkyl phenol ether, diallyl aliphatic acid ester, or polyethylene glycol diallyl aliphatic acid ester, 0.1 to 2.0 parts per hundred based on the total weight;

(f) an anionic surfactant, for example, sodium dodecylbenzosulfonate, sodium dodecylsulfonate, disodium dodecyl sulfonate phenyl ether, disodium n-stearyl succinate sulfonate or ammonium polyoxethyene nonyl phenyl ether sulfate, 0.4 to 3.0 parts per hundred based on the total weight; and (g) de-ionized water, 60 to 70 parts per hundred.

The monomer composition of the emulsion type modifier begin to react with each other through at least one initiator with the addition amount of 0.1 to 2.0 parts per hundred based on the total weight of (a)+(b)+(c). For example, the initiator can be sodium persulfate, ammonium persulfate or potassium persulfate. With the existence of the surfactant and the initiator, the monomers in the reaction tank begin to react under heating to form latex particles, under reaction temperature 50° C.–90° C. and the reaction time of 5–10 hours. The monomers of C4–C12 diester of a dicarboxylic acid, the monomers of C2–C 16 vinyl esters, the monomers of C4–C8 alkyl acrylates, the acetoacetoxy monomers, the nonionic surfactant, the anionic surfactant and the initiator can be added simultaneously or sequentially in batches. The emulsion type modifier of the present invention has an average particle diameter between about 0.1~0.4 microns, a glass transit temperature (Tg) between about −50~−30° C. and a solid content of about 50%–70% by weight (wt. %).

The present invention provides a pressure-sensitive adhesive and the composition of the pressure-sensitive adhesive includes 100 parts per hundred of pressure-sensitive emulsion acrylic adhesive and 5–30 parts per hundred of the aforementioned emulsion type modifier. The mixing ratio of the pressure-sensitive emulsion acrylic adhesive and the emulsion type modifier can be adjusted based on the requirements. Relative to the amount of the pressure-sensitive emulsion acrylic adhesive, the emulsion type modifier is added in 5–30 parts per hundred, for effectively improving the steel adhesion, PE adhesion, the loop tack and the holding power of the pressure-sensitive emulsion acrylic adhesives (referring to Table 3).

Preparation of the Emulsion Type Modifier

EXAMPLE 1

44 g of de-ionized water and 0.25 g NH4.polyoxethyene nonyl phenyl ether sulfate (Chun-Zih Synthesis Inc.) are consistently mixed to obtain the solution A.

76.7 g of de-ionized water, 2.9 g of polyoxethyene nonyl phenyl ether (Chun-Zih Synthesis Inc.), 12.9 g of NH4.polyoxethyene nonyl phenyl ether sulfate, 157.3 g of 2-ethyl hexyl methacrylate monomers, 102.6 g of dioctyl maleate monomers, 85.5 g of vinyl acetate monomers and 1.0 g of ethyl acetoacetoxy methacrylate monomers are consistently mixed to obtain the solution B.

87.5 g of de-ionized water, 1.8 g of sodium bicarbonate and 0.9 g of potassium persulfate are mixed to prepare the solution C.

20.5 g of de-ionized water and 0.9 g of potassium persulfate are mixed to prepare the solution D. Preparation of the solutions A, B, C and D can be performed individually.

The solution A and the half quantity (½) of the solution D are poured in to the emulsion and polymerization reaction system, including the stirrer, the thermometer, the heater, the reflux condenser and the five neck flask. When the solution is heated to 70° C., the mixture of 1/10 the solution B and ½ the solution D is steadily fed within 20–30 minutes into the emulsion and polymerization reaction system. Then heated to 80° C., the remaining solution B and the solution C are slowly fed within 240 minutes into the emulsion and polymerization reaction system. Next, the reaction temperature is increased to 85° C. and reacted for 90 minutes, and then cooled to the room temperature. The resultant emulsion type modifier has a solid content of 59.5%, pH 5.2, viscosity 23000 cps and its physical properties are shown in Table 1.

EXAMPLE 2

The preparation processes are performed as Example 1, except replacing 2.9 g of polyoxethyene nonyl phenyl ether in the solution B with 2.6 g of polyoxethyene octyl phenyl ether (Chun-Zih Synthesis Inc.). The resultant emulsion type modifier has a solid content of 59.0%, pH 5.1, viscosity 22800 cps and its physical properties are shown in Table 1.

TABLE 1

Physical properties of the products

| Physical properties | Example 1 | Example 2 |
|---|---|---|
| Particle size (μm) | 0.16 | 0.15 |
| Solid content (%) | 59.5 | 59.0 |
| Viscoity (cps) | 23000 | 22800 |
| Steel adhesion (kg/in) | 1.70 | 1.65 |
| PE adhesion (kg/in) | 1.20 | 1.15 |
| Loop tack (kg/in) | 1.70 | 1.68 |
| Holding power (min) | 8000 | 7800 |

Gluing conditions: the thickness of the polyester film is 25 μm; the thickness of the glue is 22 μm.

TABLE 2

Physical properties and adhesion for pressure-sensitive emulsion acrylic adhesive (Shi-Mei Inc.; PS-8105)

| Physical properties | Pressure-sensitive emulsion acrylic adhesive (Shi-Mei Inc.; PS-8105) |
|---|---|
| Solid content (%) | 60.0 |
| Viscoity (cps) | 100 |
| Steel adhesion (kg/in) | 0.96 |
| PE adhesion (kg/in) | 0.26 |
| Loop tack (kg/in) | 1.30 |
| Holding power (min) | 630 |

Coating conditions: the thickness of the polyester film is 25 μm; the thickness of the adhesive is 22 μm.

The physical properties listed in Tables 1 and 2 are obtained through the following processes:

1. Solid content (%): after measuring the weight of the plate (a), 0.5 g of latex (b) is placed on the plate and both are put into the oven, under 150° C. for 1 hour. Then the plate and latex are weighted (c). The calculation formulation: solid content (%)={(c−a)/b}*100.

2. Viscosity (cps): measured by Brook field viscosimeter, 25° C., 4# rotating rod/30 rpm.

3. Steel adhesion (kg/in): according to ASTM D-1000 standards.

4. PE adhesion (kg/in): according to ASTM D-1000 standards.

5. Loop tack (kg/in): the sample size of 25×200 mm, the glued surface facing downwards and both ends being overlapped 25 mm to form a loop. The glued surface is in contact with the steel plate and the tape is moving up in a speed of 300 mm/min, so as to calculate the maximum adhesion when the tape is separate from the steel plate, units in kg/in.

6. Holding power (min): according to PSTC-7 tape testing standards, the sample size of 25×25 mm, glued to the steel plate and holding for 1 kg. The retaining time is recorded, units in minutes.

The Effect Tests:

The product of example 1 is mixed with the pressure-sensitive emulsion acrylic adhesive (Shi-Mei Inc.; PS-8105) in different ratios and then spin coated to the polyester film (the polyester film thickness 25 μm; the adhesive thickness 22 μm). After dried under 80° C./5 minutes, it is placed under 25° C./65RH (relative humidity) for 24 hours and then the steel adhesion, PE adhesion, the loop tack and the holding power are measured. The results are listed in Table 3.

TABLE 3

Effect tests

| Physical properties | Example 1/pressure-sensitive emulsion acrylic adhesive (phr) | | | |
|---|---|---|---|---|
| | 0/100 | 5/100 | 20/100 | 30/100 |
| Steel adhesion (kg/in) | 0.96 | 1.16 | 1.20 | 1.35 |
| PE adhesion (kg/in) | 0.26 | 0.45 | 0.78 | 1.12 |
| Loop tack (kg/in) | 1.30 | 1.36 | 1.49 | 1.50 |
| Holding power (min) | 630 | 2500 | 3410 | 5890 |

Coating conditions: the thickness of the polyester film is 25 μm; the thickness of the adhesive is 22 μm.

From Table 3, it is shown that the adhesion, including steel adhesion, polyethylene (PE) adhesion, the loop tack and the holding power, of the pressure-sensitive emulsion acrylic adhesives can be effectively improved by adding the emulsion type modifier of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An emulsion type modifier for improving properties of a pressure-sensitive emulsion acrylic adhesive, the emulsion type modifier prepared by polymerizing an emulsion consisting of:
   (a) 15 to 35 parts per hundred of monomers of a C6–C12 diester of a dicarboxylic acid, wherein the C6–C12 diester of the dicarboxylic acid contain 6 to 12 carbon atoms in each alkyl group of the diester;
   (b) 15 to 35 parts per hundred of monomers of a C2–C16 vinyl ester;
   (c) 35 to 65 parts per hundred of monomers of a C4–C8 alkyl acrylate;
   (d) 0.1 to 2.0 parts per hundred of monomers containing an acetoacetoxy functional group;
   (e) 0.1 to 2.0 parts per hundred of a nonionic surfactant;
   (f) 0.4 to 3.0 parts per hundred of an anionic surfactant; and
   (g) 60 to 70 parts per hundred of de-ionized water;
   wherein a total weight of (a)+(b)+(c) is 100 parts, while (d), (e), (f) and (g) are added based on the total weight of (a)+(b)+(c).

2. The emulsion type of modifier of claim 1, wherein the C6–C12 diester of the dicarboxylic acid is dioctyl maleate.

3. The emulsion type of modifier of claim 1, wherein the C2–C16 vinyl ester is selected from the group consisting of vinyl butyrate, vinyl isobutyrate and vinyl acetate.

4. The emulsion type of modifier of claim 1, wherein the C4–C8 alkyl acrylate is selected from the group consisting of butyl acrylate, and decyl acrylate.

5. The emulsion type of modifier of claim 1, wherein the monomers containing an acetoacetoxy functional group are monomers of ethyl acetoacetoxy methacrylate or monomers of butyl acetoacetoxy methacrylate.

6. The emulsion type of modifier of claim 1, wherein the nonionic surfactant is selected from the group consisting of polyoxethyene nonyl phenyl ether, polyoxethyene octyl phenyl ether, polyethylene glycol alkyl phenol ether, diallyl aliphatic acid ester and polyethylene glycol diallyl aliphatic acid ester.

7. The emulsion type of modifier of claim 1, wherein the anionic surfactant is selected from the group consisting of sodium dodecylbenzosulfonate, sodium dodecylsulfonate, disodium dodecyl sulfonate phenyl ether, disodium n-stearyl succinate sulfonate and ammonium polyoxethyene nonyl phenyl ether sulfate.

8. A pressure-sensitive adhesive, comprising:
   100 parts per hundred of a pressure-sensitive emulsion acrylic adhesive; and
   5 to 30 parts per hundred of the emulsion type of modifier of claim 1.

* * * * *